(12) United States Patent
Huang et al.

(10) Patent No.: US 8,747,526 B2
(45) Date of Patent: Jun. 10, 2014

(54) VERTICAL TYPE AIR HUMIDIFYING AND PURIFYING MACHINE

(75) Inventors: Ping Huang, Tainan (TW); Ying-Pin Huang, Tainan (TW); Chia-Chang Lee, Tainan (TW)

(73) Assignee: Hung Hsing Electric Co., Ltd., Tainan (TW)

( * ) Notice: Subject to any disclaimer, the term of this patent is extended or adjusted under 35 U.S.C. 154(b) by 316 days.

(21) Appl. No.: 13/370,351

(22) Filed: Feb. 10, 2012

(65) Prior Publication Data
US 2013/0206009 A1    Aug. 15, 2013

(51) Int. Cl.
*B03C 3/016*    (2006.01)

(52) U.S. Cl.
USPC ............... 96/16; 96/52; 96/53; 96/55; 96/74; 96/224; 422/4; 422/22; 422/24; 422/186.3

(58) Field of Classification Search
CPC ............... A61L 9/00; A61L 9/18; A61L 9/20; A61L 9/22; B03C 3/00

USPC .................... 96/15, 16, 224; 422/1, 22, 24
See application file for complete search history.

(56) References Cited

U.S. PATENT DOCUMENTS

| 7,967,900 | B2 * | 6/2011 | Uchida et al. .................... 96/234 |
| 2010/0224072 | A1 * | 9/2010 | Ulanov ............................ 96/222 |

* cited by examiner

*Primary Examiner* — Duane Smith
*Assistant Examiner* — Sonji Turner
(74) *Attorney, Agent, or Firm* — Rosenberg, Klein & Lee

(57) ABSTRACT

A vertical type air humidifying and purifying machine, comprising a front casing, a rear casing, a humidifying unit, an ultraviolet light purifying unit, a motor-fan unit and a negative ion generator; in which the front casing and the rear casing are assembled correspondingly with each other, and the humidifying unit, the UV light purifying unit, and the motor-fan unit are disposed orderly between the front and the rear casings, and the negative ion generator is installed at an air outlet of the motor-fan unit; ON-OFF switches being respectively provided on the humidifying unit, the UV purifying unit and the negative ion generator for ON-OFF switching.

8 Claims, 4 Drawing Sheets

VERTICAL TYPE AIR HUMIDIFYING AND PURIFYING MACHINE

BACKGROUND OF INVENTION

1. Field of the Invention

The present invention relates to a vertical type air humidifying and air purifying machine, more particularly to a dual purpose air humidifying and air purifying machine.

2. Brief Description of Prior Art

Accompanying with the progress of civilization, natural environment has been becoming more and more deteriorated. Especially, the air pollution caused by industrial poisonous gas and gas exhausted from cars and motorcycles are among the serious pollutant sources. In the meantime, people are increasingly paying more attention to the environmental protection issues. Hence, various air purifying apparatuses have been created in response to this situation. Furthermore, as water is easily evaporated in dry air environment, people often get dry or cracking skins which make people feeling discomfortable. Therefore, it becomes very important to artificially increase the humidity in the indoor air so that the environment will not become too dry.

In view of the abovementioned situation, various humidifiers for adding humidity to indoor air and various air purifiers for purifying indoor air are present on the market, such as Taiwanese Patent No. M397500 "Air purifying and humidifying machine", Taiwanese Patent No. M380458 "Cooling and Heating type humidifier", Taiwanese Patent No. M327457 "Heating and Humidifying Machine", Taiwanese Patent No. I264514 "Safe Structure of Humidifier", Taiwanese Patent No. M419889 "Separate Type Air Purifier", Taiwanese Patent No. M416057 "Cooling and Heating Type Air Purifier", Taiwanese Patent No. M404950 "Air Purifier having Air Quality Displayed". However, each of these patents only has a single function of either air humidifying or air purifying, and thus they fail to satisfy the appeal of consumers.

SUMMARY OF THE INVENTION

In order to satisfy the demand of customers, the inventor of the present invention proposes a dual purpose machine enabling air humidifying and air purifying, and the machine can be operated according to the local environment demand of customers.

A vertical type air humidifying and purifying machine, comprising a front casing, a rear casing, a humidifying unit, an ultraviolet light purifying unit, a motor-fan unit and a negative ion generator; in which the front casing and the rear casing are assembled correspondingly with each other, and the humidifying unit, the UV light purifying unit, and the motor-fan unit are disposed orderly in upper-down direction between the front and the rear casings, and the negative ion generator is installed at an air outlet of the motor-fan unit: switches being respectively provided on the humidifying unit, the UV purifying unit and the negative ion generator for ON-OFF switching.

Configuring like this, users can start one or over two of the humidifying unit, the UV purifying unit and the negative ion generator provided on unitary machine independently so as to conduct air humidifying or air purifying independently, or to conduct air humidifying and air purifying simultaneously. Accordingly, the implementation of its overall structure can be conformed more closely to the reality situation.

That is, the vertical type air humidifying and purifying machine is a dual purpose machine enabling air humidifying and purifying, in which water mist is discharged by the humidifying unit to the top end of the machine for ejection and the air purified can be discharged by the motor-fan unit to the top end; both the humidifying unit and the motor-fan unit can work independently or simultaneously. Therefore, the overall implementation conforms more closely to the reality situation; hence better selective operation can be achieved so that the defect of conventional machine with single function can be improved.

DETAILED DESCRIPTION OF PREFERRED EMBODIMENTS

The objects, the technical contents and the expected effect of the present invention will become more apparent from the detailed description of the preferred embodiment in conjunction with the accompanying drawings.

Figure 1:
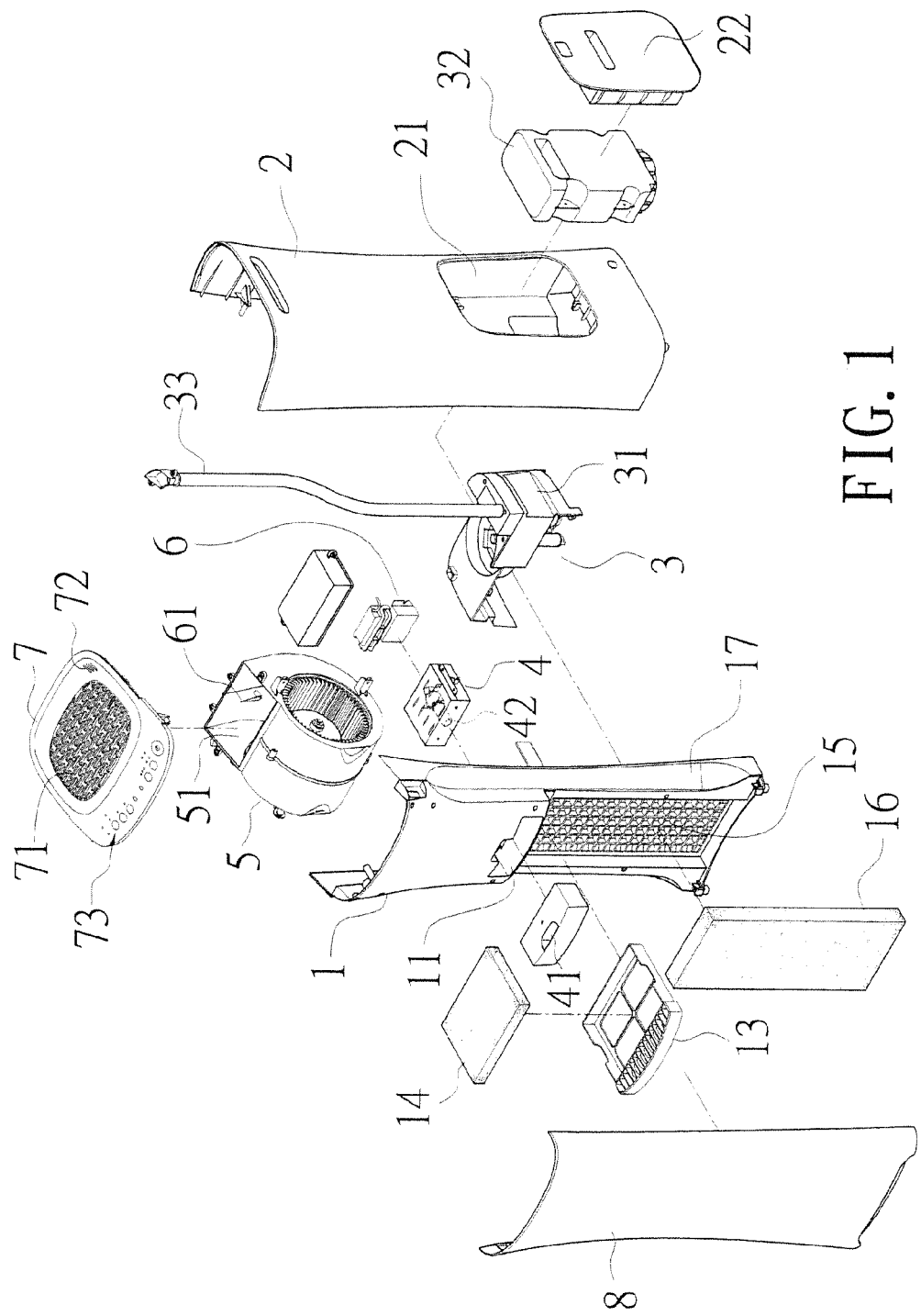
FIG. 1 is a perspective exploded view of the vertical type air humidifying and purifying machine of the present invention.

Firstly referring to FIG. 1, a perspective exploded view of the vertical type air humidifying and purifying machine of the present invention is shown.

The vertical type air humidifying and purifying machine of the present invention comprises: a front casing (1), a rear casing (2), a humidifying unit (3), an ultraviolet light purifying unit (4), a motor-fan unit (5) and a negative ion generator (6).

The front casing (1) and the rear casing (2) are assembled correspondingly with each other, and the humidifying unit (3), the UV light purifying unit (4), and the motor-fan unit (5) are disposed orderly in upper-down direction between the front (1) casing and the rear casing (2), and the negative ion generator (6) is installed at an air outlet of the motor-fan unit (5).

Figure 2:
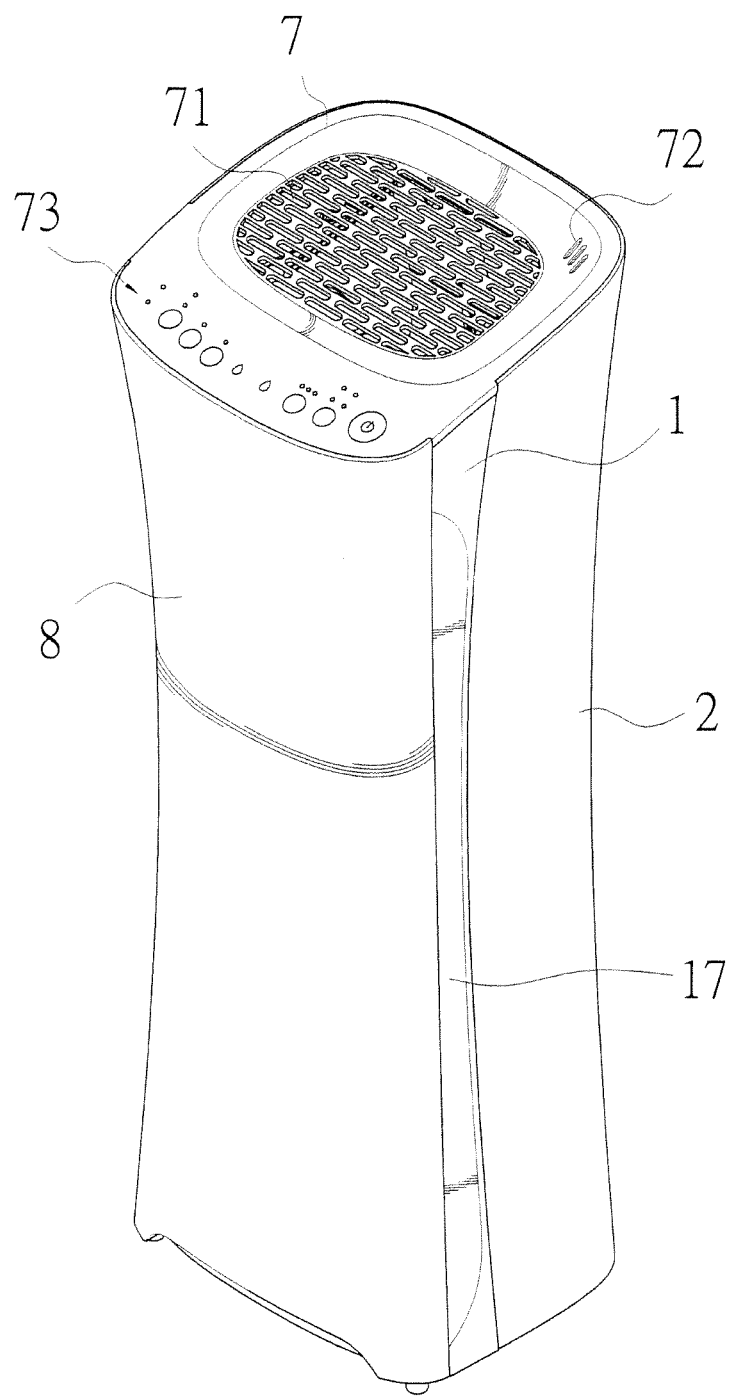
FIG. 2 is a perspective assembled view of the appearance of the vertical type air humidifying and purifying machine of the present invention.
Figure 3:
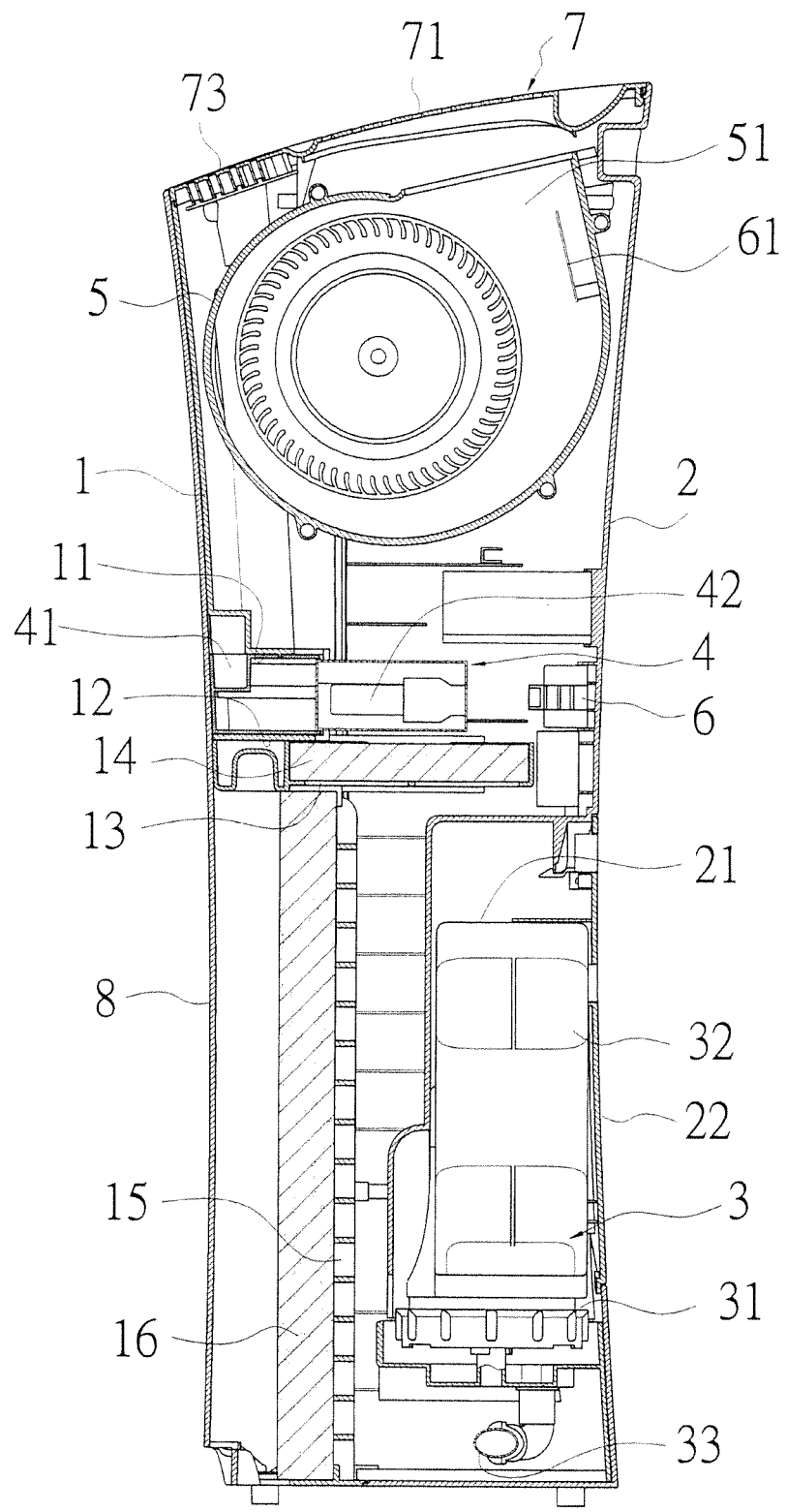
FIG. 3 is a sectional side view of the vertical type air humidifying and purifying machine of the present invention.
Figure 4:
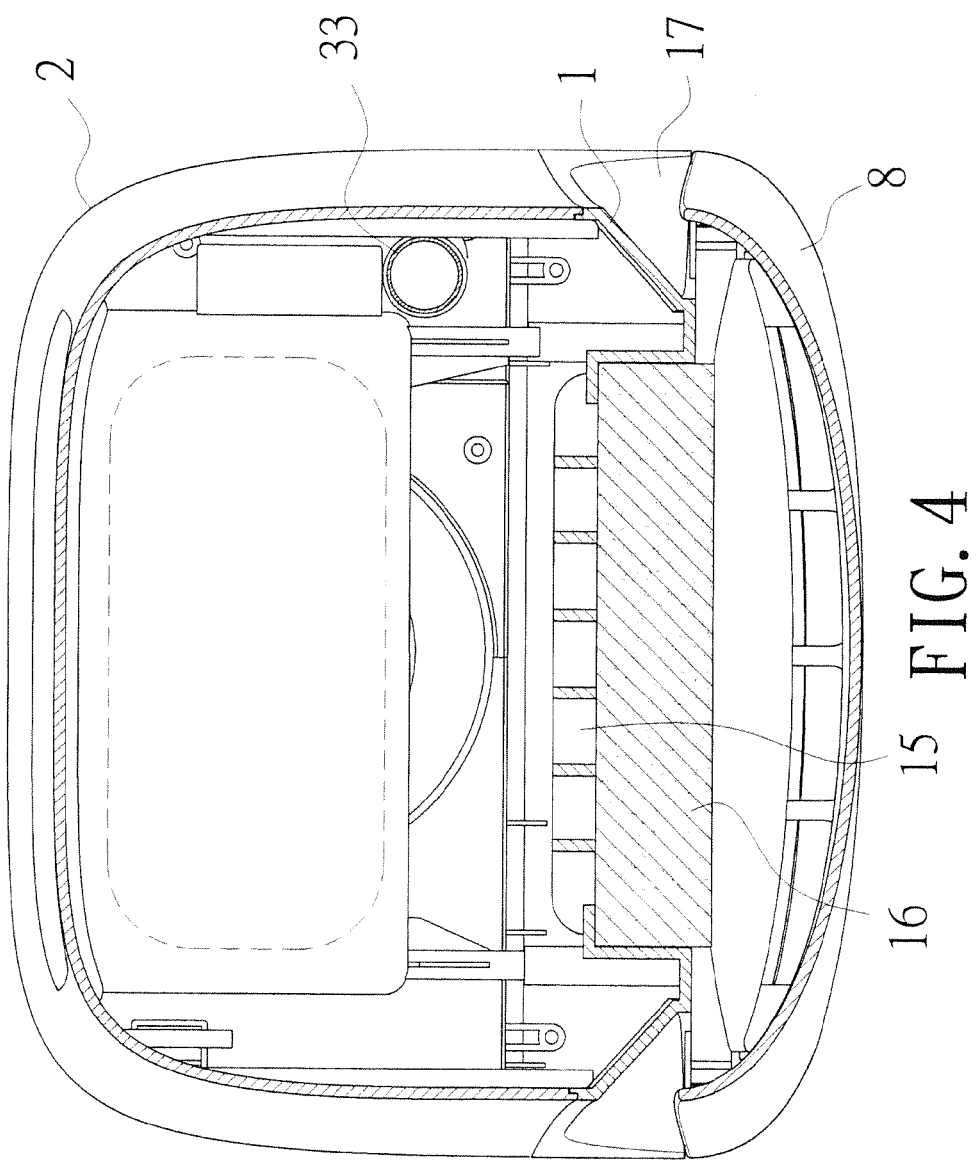
FIG. 4 is a sectional top view of the vertical type air humidifying and purifying machine of the present invention.

Especially referring to FIGS. 2 to 4, the front casing (1) has a through slot (11) provided at the middle portion thereof and an assembling slot (12) is provided beneath the through slot (11). A mounting frame (13) is disposed within the assembling slot (12) and a first filter unit (14) is installed in the mounting frame (13). A reticulate wall face area (15) is provided below the assembling slot (12) and a second filter unit (16) is provided correspondingly at one side of the reticulate wall face area (15).

An accommodation area (21) with an opening facing rearward is provided in the rear casing (2).

The humidifying unit (3) comprises: a humidifying main machine (31) provided below a space formed after the assembly of the front casing (1) and the rear casing (2); and a water tank (32), a mist guiding tube (33) respectively connected with the humidifying main machine (31), the water tank (32) being received within the accommodation area (21) of the rear casing (2).

The UV light purifying unit (4) is installed in the through slot (11) of the front casing (1) and the UV light purifying unit (4) further has a grip hole (41) on which users can grip by hands to take out the UV light purifying unit (4) in order to replace the UV light lamp tube (42) on it.

The motor-fan unit (5) is installed above the space formed after the assembly of the front casing (1) and the rear casing (2), and the air outlet (51) thereof is disposed to face upwardly.

The negative ion generator (6) is installed at the middle place of the space formed after the assembly of the front casing (1) and the rear casing (2), the discharge end (61) thereof being located at the air outlet (51) of the motor-fan unit (5).

Furthermore, after the combination of the front casing (1) and the rear casing (2), a top cover (7) is provided at the top end of the combined casings. The top cover (7) has a first exit area (71) corresponding to the air outlet (51) of the motor-fan unit (5) and a second exit area (72) corresponding to the exit of the mist guiding tube (33) of the humidifying unit (3). Moreover, a push-button control area (73) is provided on the top cover (7) for operating the ON-OFF of each unit.

Furthermore, a front decoration cover (8) is provided at the front side cover of the front casing (1) for shielding the front casing (1). Recess areas (17) are respectively provided at both sides of the front casing (1) so as to form gaps respectively with the front decoration cover (8) after the assembly of the front decoration cover (8) at the front side of the front casing (1), the gaps being formed as air inlets. In the mean time, a gap is also formed between the front decoration cover (8) and the bottom end of the front casing (1) and this gap is also formed as another air inlet.

Furthermore, a rear cover (22) is provided at a place corresponding to the opening of the accommodation area (21) of the rear casing (2).

When in usage, users can push the switches on the push-button control area (73) according to the requirement of the ambience environment so as to actuate the humidifying unit (3), the UV light purifying unit (4), the motor-fan unit (5) and the negative ion generator (6). The humidifying unit (3), the UV light purifying unit (4), and the negative ion generator (6) can be started independently or simultaneously so that the vertical type air humidifying and purifying machine can be operated in a single mode or in over two modes simultaneously.

When the humidifying unit (3) is started, the humidifying main machine (31) can allow the water provided by the water tank (32) to vibrate to become water mist by supersonic wave vibration action, and the water mist is ejected from the second exit area (72) through the mist guiding tube (33) so as to humidifying the ambience air.

When the UV light purifying unit (4) is started, the motor-fan unit (5) has to be operated simultaneously so that the outside air is introduced into the interior of the vertical type air humidifying and purifying machine through the gap formed between the front casing (1) and the front decoration cover (8). After the air thus introduced is conducted with filtration by the second filter unit (16) and the first filter unit (14) and with sterilization by the UV light purifying unit (4), the filtered and sterilized air is discharged out from the air outlet (51) through the first exit area (71) of the top cover (7) to the outside.

When the negative ion generator (6) is actuated, the motor-fan unit (5) has to be operated simultaneously. As the discharge end (61) of the negative ion generator (6) is directly disposed at the air outlet (51), negative ions produced at the discharge end (61) of the negative ion generator (6) can be outputted to the ouside from the first exit area (71) of the top cover (7) by the wind sent out from the motor-fan unit (5) so as to increase the negative ion content in the ambience environment.

Based on foregoing, as the present invention comprises a humidifying unit, a UV light purifying unit, a negative ion generator, the vertical type humidifying and purifying machine of the present invention can possess dual functions of air humidifying and air purifying.

The abovementioned is merely a part of embodiments of the present invention, and is not intended to limit the scope of the present invention. Variations and modifications conducted without departing from the spirit and scope of the present invention is still considered to be within the scope of the present invention.

What is claimed is:

1. A vertical type air humidifying and purifying machine, comprising:
   a front casing, having a through slot provided at the middle portion thereof and an assembling slot provided beneath said through slot; a mounting frame being disposed within said assembling slot and a first filter unit being installed within said mounting frame; a reticulate wall face area being provided below said assembling slot and a second filter unit being provided correspondingly at one side of said reticulate wall face area;
   a rear casing assembled correspondingly with said front casing, said rear casing having an accommodation area with an opening facing rearward;
   a humidifying unit, including a humidifying main machine and a water tank, a mist guiding tube connected therewith respectively which are all located beneath the space enclosed by said front casing and said rear casing, said water tank being received in said accommodation area;
   an ultraviolet light purifying unit installed in said through slot of said front casing;
   a motor-fan unit, installed above the space enclosed by said front casing and said rear casing, an air outlet of said motor-fan unit being disposed to face upwardly; and
   a negative ion generator, installed at the middle place of the space enclosed by said front casing and said rear casing, the discharge end of said negative ion generator being located at said air outlet of said motor-fan unit.

2. The vertical type air humidifying and purifying machine as claimed in claim 1, wherein said UV light purifying unit has a grip hole for users to grip by hands so as to take out said UV light purifying unit from said through slot of said front casing.

3. The vertical type air humidifying and purifying machine as claimed in claim 1, wherein a top cover is provided at the top end of the combination of said front casing and said rear casing, said top cover having a first exit area corresponding to said air outlet of said motor-fan unit and a second exit area corresponding to the exit of said mist guiding tube of said humidifying unit, and a push-button control area being provided at said top cover.

4. The vertical type air humidifying and purifying machine as claimed in claim 3, wherein a front decoration cover is provided at the front side cover of said front casing, and recess areas being provided at both sides of said front decoration cover so as to form gaps at both sides after said front decoration cover is assembled with said front casing.

5. The vertical type air humidifying and purifying machine as claimed in claim 4, wherein a rear cover for shielding said water tank is provided at a place corresponding to the opening of said accommodation area of said rear casing.

6. The vertical type air humidifying and purifying machine as claimed in claim 1, wherein a front decoration cover is provided at the front side cover of said front casing, and recess areas being provided at both sides of said front decoration cover so as to form gaps at both sides after said front decoration cover is assembled with said front casing.

7. The vertical type air humidifying and purifying machine as claimed in claim 6, wherein a rear cover for shielding said water tank is provided at a place corresponding to the opening of said accommodation area of said rear casing.

8. The vertical type air humidifying and purifying machine as claimed in claim 1, wherein a rear cover for shielding said water tank is provided at a place corresponding to the opening of said accommodation area of said rear casing.

* * * * *